J. L. SPOONTS & E. M. EUBANK.
WHEEL.
APPLICATION FILED SEPT. 11, 1909.
989,437.
Patented Apr. 11, 1911.
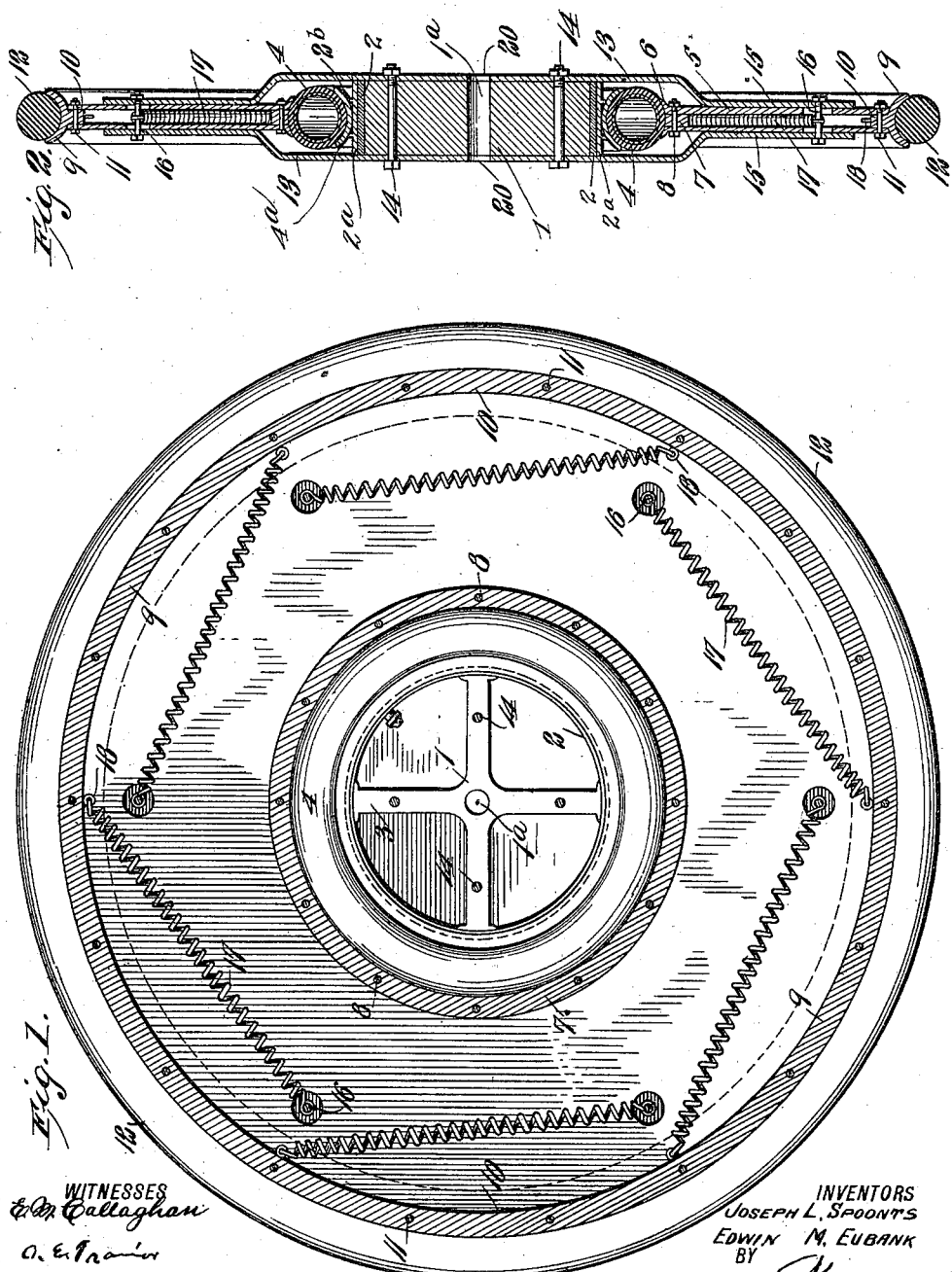
WITNESSES
INVENTORS
JOSEPH L. SPOONTS
EDWIN M. EUBANK
BY
ATTORNEYS

UNITED STATES PATENT OFFICE.

JOSEPH L. SPOONTS AND EDWIN M. EUBANK, OF BALLINGER, TEXAS.

WHEEL.

989,437.  Specification of Letters Patent.  Patented Apr. 11, 1911.

Application filed September 11, 1909. Serial No. 517,187.

*To all whom it may concern:*

Be it known that we, JOSEPH L. SPOONTS and EDWIN M. EUBANK, citizens of the United States, and residents of Ballinger, in the county of Runnels and State of Texas, have invented certain new and useful Improvements in Wheels, of which the following is a specification.

Our invention is an improvement in wheels, and consists in certain novel constructions and combinations of parts hereinafter described and claimed.

The object of the invention is to provide a wheel having a pneumatic tire, but wherein the tire will be so placed that it will not contact with the ground, thus reducing the wear to a minimum, and preventing punctures and like injuries.

Referring to the drawings forming a part hereof, Figure 1 is a longitudinal section of the wheel, and Fig. 2 is a transverse section.

The embodiment of the invention shown in the drawings consists of an auxiliary wheel or disk composed of a hub 1, which is connected to the felly 2, by spokes 3, the hub being provided with the usual opening 1ª for receiving the axle. A flat rim 2ª is seated on the felly and near its center the flat rim is provided with spaced annular ribs 2ᵇ between which is arranged a transversely curved or concave rim 4ª supporting a pneumatic tire 4. A pair of annualr plates 5 are arranged outside of the tire, the inner edges of the plates being flanged as at 6 for engaging the tire, and a ring 7 is secured between the said inner edges by bolts 8, which pass through registering openings in the plates and the ring, and the inner edge of the ring also engages the tire, the flanges and ring forming a rim for engaging the said outer surface. A third rim 9 is provided with an annular rib 10 which is received between the outer edges of the plates, and is secured therebetween by bolts 11 traversing the edges and rib, and a solid tire 12 is seated in the said rim. The rib 10 and the ring 7 are of equal thickness, and space the plates 5 apart to form an annular space therebetween for a purpose to be presently described. A disk or cheek piece 13 is arranged on each side of the hub, and secured thereto by bolts 14, passing through the cheek pieces and spokes, and beyond the pneumatic tire the cheek pieces are offset inwardly as at 15 and engage the outer faces of the plates 5. At suitable intervals the cheek pieces are provided with openings, and the plates with registering openings of larger diameter and bolts 16 pass through the openings for securing the said parts in sliding engagement. Springs 17 are arranged within the annular space between the plates and connected at one end to the said bolts, and at the other to eyes 18 in the rim 9. The cheek pieces are also provided with central openings 20, which register with the opening 1ª of the hub.

The improved wheel is made of any suitable material, and of any desired proportions, and is assembled as follows: The plates 5 are bolted together, with the ring 7 and the rim 9, both of which are preferably of wood, in place, after the springs have been attached. The cheek pieces are then secured in place, and the wheel is ready for use.

It will be evident from the description, that the improved wheel is very simple in construction, easily assembled and disassembled, and that the pneumatic tire is entirely protected from external violence, unless such violence is sufficient to wreck the wheel. The advantages of the pneumatic tire are retained and utilized, with all of the disadvantages eliminated. In addition to the resilience imparted by the pneumatic tire, there is the resilience of the solid tire, and of the springs 17. In use, the solid tire engages the ground, and a considerable portion of the jars and jolts are absorbed by the said tire. The auxiliary wheel is permitted a considerable extent of radial movement with respect to the frame, by the pneumatic tire and the said tire absorbs the shocks which are too great for the solid tire. The openings in the frame through which pass the bolts 16, are of much greater diameter than the registering openings in the cheek pieces, so that the frame is movable radially of the cheek pieces and also angularly with respect thereto. The springs which are tangential to the wheel, are for the purpose of normally retaining the frame and cheek pieces in the same relative angular position with respect to each other.

The improved wheel consists broadly of an inner and an outer wheel, the said wheels being movable radially and angularly with respect to each other, and yielding means for retaining them in normal position. The wheel might also be described as a wheel comprising a wheel, a ring concentric with the wheel, and capable of the above movement.

We claim:

A wheel comprising a pair of annular cheek pieces, each having at its periphery an annular inwardly off-set portion, a disk arranged between the pieces and concentric therewith, said pieces and disk being secured together, a flat rim on the periphery of the disk, said rim being provided with spaced annular ribs, a curved rim seated between the ribs, a pneumatic tire seated on the curved rim, a pair of annular plates secured together in spaced relation, a rim at the inner edge of the said plates and seated on the pneumatic tire, a rim at the outer edge of the plates, a solid tire seated on the rim and a yielding connection between the plates and the cheek pieces.

JOE L. SPOONTS.
EDWIN M. EUBANK.

Witnesses:
A. D. Stone,
Lena Jones.

Copies of this patent may be obtained for five cents each, by addressing the "Commissioner of Patents, Washington, D. C."